T. L. WEBSTER.
Plows.

No. 152,887.

Patented July 7, 1874.

WITNESSES:

INVENTOR:
Theodore L. Webster
by atty

UNITED STATES PATENT OFFICE.

THEODORE L. WEBSTER, OF BROOKLYN, NEW YORK.

IMPROVEMENT IN PLOWS.

Specification forming part of Letters Patent No. 152,887, dated July 7, 1874; application filed June 8, 1874.

*To all whom it may concern:*

Be it known that I, THEODORE L. WEBSTER, of Brooklyn, New York, have invented certain new and useful Improvements in Plows, of which the following is a specification:

In the plow in which my invention is comprised are found devices for guiding the plow and regulating the depth of furrow. I combine, for the purpose of guiding the plow, a vertical cutter arranged over the nose of the plow in the usual way, but beveled only on one side, so as to give the plow a tendency to run to the land side, and a rotary flanged wheel arranged so that its flange will run in the furrow last made, and thus cause the wheel to offset or resist the action of the beveled cutter, the combined action of the two being to materially lighten the labor of guiding the plow. On the land side of the plow-beam I place pressure-wheels for regulating the depth of cut, one of these wheels being mounted on the beam at a point in advance of the flanged guide-wheel, and the other one being carried on the after part of the plow. The cut-regulating wheels, as well as the guide-wheel, are adjusted vertically by means hereinafter described.

Figure 1:
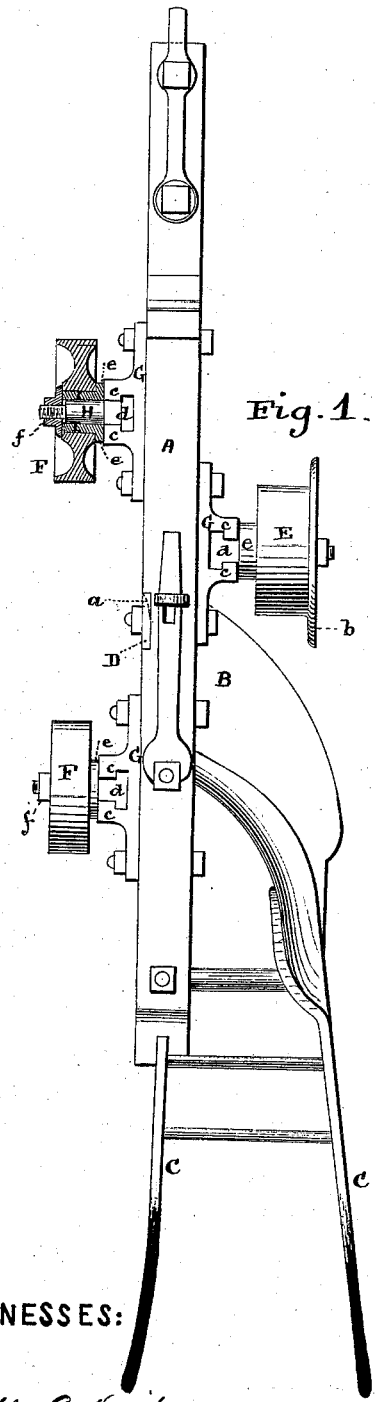
Figure 2:
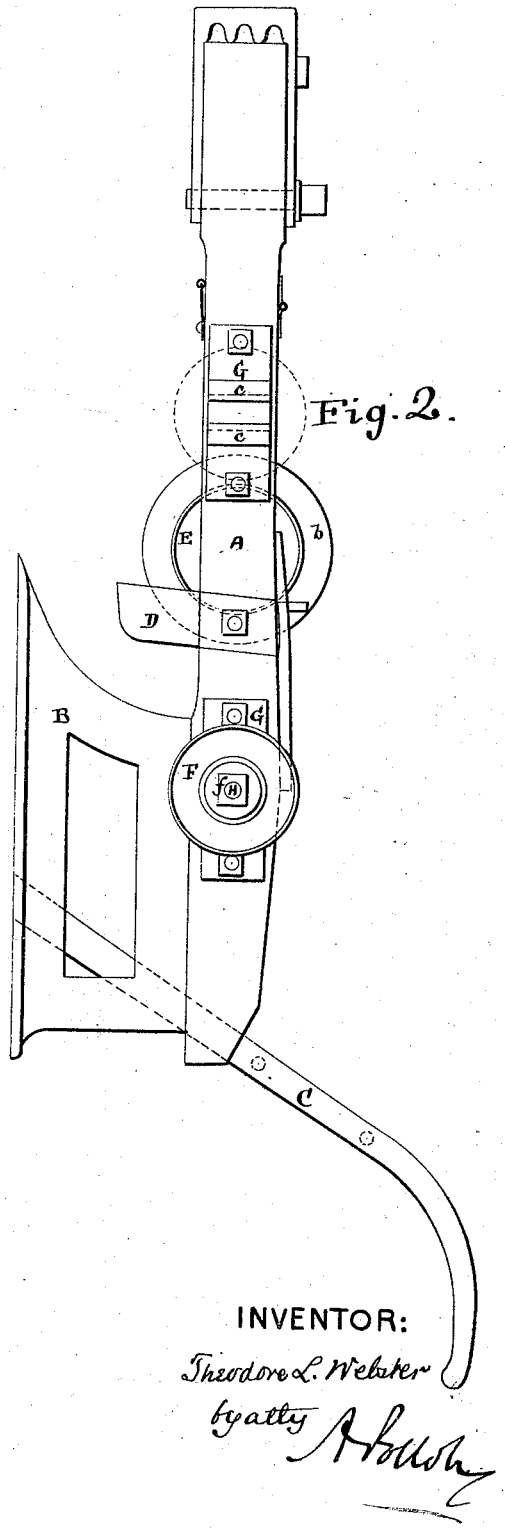

The accompanying drawing represents, in Figure 1 a plan, and in Fig. 2 a side elevation, of a plow made in accordance with my invention.

A is the beam, B the share, and C the handles, these parts being of ordinary or suitable construction. The cutter is represented at D. Its arrangement is substantially that found in ordinary plows, as is also its general structure, except that it is beveled only on one side, and in the direction of the land side, as indicated by the dotted line $a$, in Fig. 1. A cutter thus beveled will manifestly have a tendency to deflect the plow, when in use, toward the land side. To counteract this tendency, I mount on the other side of the plow-beam flanged wheel E, arranged about opposite to the nose of the plow, and located in such a manner that its beveled flange $b$ will run in the furrow last made by the plow; and, thus running in the furrow, will resist the tendency of the plow to run to the land side. In this way, by the combined action of these two devices, little or no exertion is required to guide the plow. The flanged wheel is adjustable vertically, so that it may be set at different heights, as required. On the land side of the plow-beam are mounted two pressure or cut-regulating wheels, F, located in the position indicated in Fig. 1, in which the front roller is represented in horizontal cross-section. In Fig. 2 this roller is removed in order to show the ways or guides in which it is held. These wheels, like the flanged guide-wheel, are vertically adjustable.

The means of adjustment that I prefer are represented fully in the drawing. All three wheels are mounted in the same way, so that a description of one will answer for all. For guides or ways in which the wheel can be moved up and down I provide a plate, G, with undercut parallel flanges $c$, between which is placed the square head $d$ of a bolt, H, whose cylindrical stem is encircled by a bushing or sleeve, I, having a flange, $e$, to rest against the guides or ways $c$, and being of a length slightly exceeding that of the hub of the wheel F or E mounted on said bushing, so that the hub may not be cramped or bound by the nut $f$, which is screwed on bolt H down on the outer end of bushing I.

By tightening this nut, the head of the bolt will be clamped in the ways $c$ at any desired point. By loosening it, the wheel may be adjusted up or down, as required.

Having described my invention, what I claim, and desire to secure by Letters Patent, is—

The described combination, in a plow, of the cutter beveled only on one side, and the flanged guide-wheel, arranged and operating together substantially as shown and set forth.

In testimony whereof I have hereunto signed my name this 2d day of June, A. D. 1874.

THEODORE L. WEBSTER.

Witnesses:
 JAS. S. PRIDE,
 F. W. HANAFORD.